Dec. 6, 1960 G. F. CEROFOLINI 2,963,558

NEGATIVE IMPEDANCE REPEATER

Filed Nov. 13, 1958

INVENTOR.
G. F. CEROFOLINI

BY [signature]

ATTY.

United States Patent Office 2,963,558
Patented Dec. 6, 1960

2,963,558

NEGATIVE IMPEDANCE REPEATER

Gabriele F. Cerofolini, Milan, Italy, assignor to Automatic Electric Laboratories, Inc., a corporation of Delaware Filed Nov. 13, 1958, Ser. No. 773,678

7 Claims. (Cl. 179—170)

This invention relates to negative impedance converters, and more particularly to such converters as used in repeaters for telephone transmission lines.

The general object of this invention is to provide a circuit arrangement for negative impedance converters with a minimum number of components, particularly amplifying devices, per converter, without impairing performance.

A specific object is to provide a repeater having a series type converter and a shunt type converter with an arrangement in accordance with the general object.

Negative impedance repeaters and the converters used therein, employing vacuum tubes as active elements, have been described by J. L. Merrill, Jr., in U.S. Patent No. 2,742,616, and similar circuits employing transistors have been described by Linvill in U.S. Patent No. 2,726,370. Repeaters using these prior art converters have been found to have good performance and to be very useful in certain types of applications, particularly with certain types of telephone transmission lines, since amplification can be obtained in two directions without using hybrid circuits. For optimum performance with respect to impedance matching and gain, it has been found desirable to use repeaters having two converters, one connected in series and one connected in shunt of the line. However, each converter uses a separate set of amplifying devices and other circuit components.

According to the invention a combination of two negative impedance converters is provided using a single pair of amplifying devices and other circuit components in common, with circuit connections for push-pull coupling the pair of amplifying devices between the two sets of terminals of one converter, and for parallel coupling the pair of amplifying devices between the two sets of terminals of the other converter.

In one embodiment of the invention the two converters are used to form a combination series-shunt repeater. In a preferred embodiment the push-pull converter is connected in series with a line and the parallel converter is connected in shunt of the line.

Figure 1:
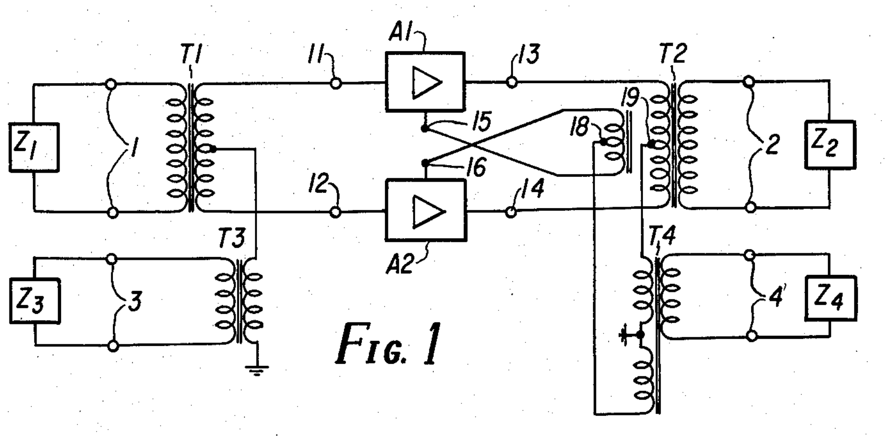
Figure 2:
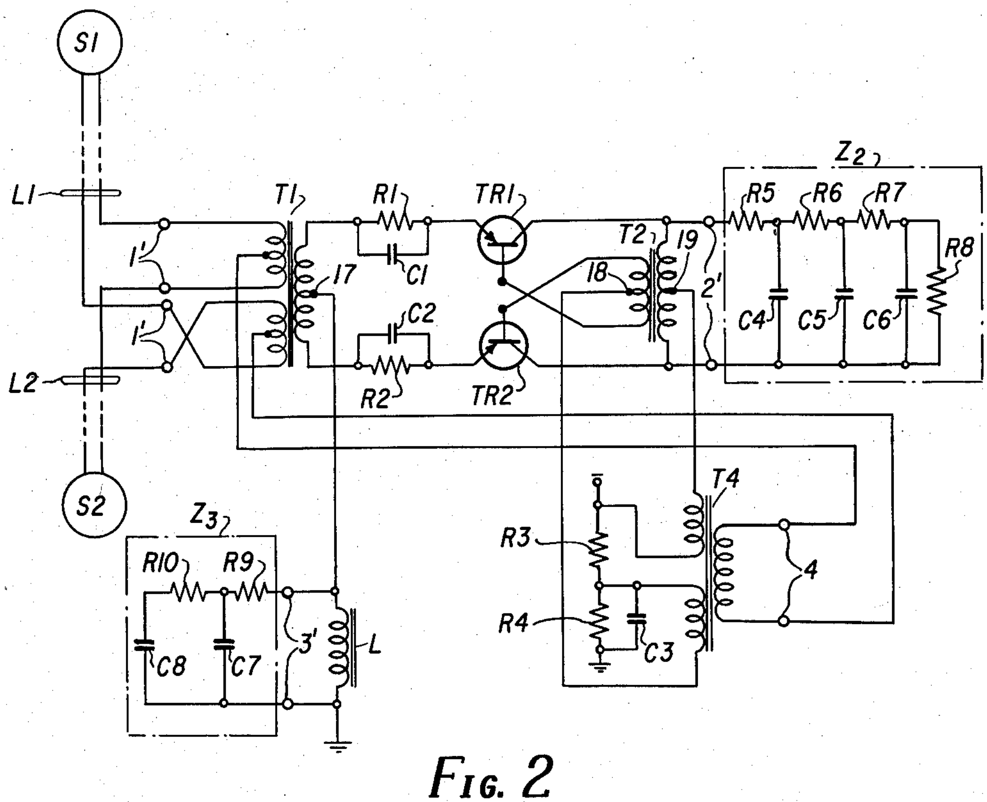

The above-mentioned and other objects and features of this invention and the manner of attaining them will become more apparent, and the invention itself will be best understood, by reference to the following description of an embodiment of the invention taken in conjunction with the accompanying drawings comprising Figures 1 and 2 wherein:

Fig. 1 is a diagram of a combination of two converters according to the invention; and Fig. 2 is a schematic diagram of a specific embodiment of the combination shown in Fig. 1.

The diagram of Fig. 1 shows the alternating current signal connections for two negative impedance converters using a common pair of amplifying devices A1 and A2. In one converter these amplifying devices A1, A2 are coupled in push-pull between the terminals 1 connected to the terminating network Z1 and terminals 2 connected to a terminating network Z2. In the other converter the amplifying devices A1, A2 are coupled in parallel between the terminals 3 connected to a terminating network Z3 and terminals 4 connected to a terminating network Z4. The respective input terminals 11 and 12 of the amplifying devices A1 and A2 are connected to opposite ends of a winding of transformer T1. The center tap 17 of this winding is connected through a winding of transformer T3 to ground. The respective output electrodes 13 and 14 are connected to opposite ends of a winding of transformer T2, and the center tap 19 of this winding is connected through a winding of transformer T4 to ground. The respective common electrodes 15 and 16 are connected to the opposite ends of another winding of transformer T2, and the center tap 18 of this winding is connected through another winding of transformer T4 to ground.

The push-pull converter has one set of terminals 1 coupled across transformer T1, either by a separate winding as shown, or alternatively by connections (not shown) directly or through condensers to points of the winding between the electrodes 11 and 12; and the other set of terminals 2 in like manner may be coupled across transformer T2 either by a separate winding as shown, or by direct or capacitive coupling (not shown) to points of the winding between the electrodes 13 and 14. If transformers T3 and T4 are short-circuited so that the center taps 17, 18 and 19 are at ground potential, it will be recognized that the push-pull converter is a conventional type as disclosed by Merrill and by Linvill. The voltage appearing between the electrodes 13 and 14 is transformer coupled with phase reversal to the common electrodes 15 and 16.

The amplifying devices A1 and A2 may be vacuum tubes, in which case the input electrodes 11 and 12 are the cathodes, the output electrodes 13 and 14 are the anodes, and the common electrodes 15 and 16 are the grids as disclosed by Merrill. Or transistors may be employed as disclosed by Linvill, in which case the input electrodes 11 and 12 are the emitters, the output electrodes 13 and 14 are the collectors, and the common electrodes 15 and 16 are the bases.

With signal voltages appearing across either the terminals 1 or terminals 2 of the push-pull repeater, the component from any of the center taps 17, 18 or 19 to ground will be zero. Therefore the transformers T3 and T4 may be connected between these center tap points and ground as shown without being influenced by the push-pull signals. The terminals 3 of the parallel converter may be connected to a separate winding of transformer T3 as shown, or they may be connected either directly or capacitively (not shown) to points of the winding between the center tap 17 and ground. The terminals 4 may be connected to a separate winding of transformer T4 as shown, or they may be connected either directly or capacitively (not shown) to points of either or both windings between center taps 18 and 19 and ground. With signal voltages applied to either terminals 3 or terminals 4, the currents flowing from the center taps will divide through the associated windings of transformers T1 and T2 in opposition so that no voltage appears across either of these transformers. Thus there is no effect on the push-pull circuit. The amplifying devices are then in parallel, with the voltage at the output electrodes 13 and 14 to ground being reversed in phase by transformer T4 and applied to the common electrodes 15 and 16.

Analysis shows that the push-pull converter is open-circuit stable at terminals 1 and short-circuit stable at terminals 2; and likewise that the parallel converter is open-circuit stable at terminals 3 and short-circuit stable at terminals 4.

Fig. 2 illustrates an embodiment of the invention as a combination series-shunt repeater in a telephone line. When in use the telephone line will be terminated as by telephone subsets, shown here as stations S1 and S2. Transistors TR1 and TR2 are used as amplifying devices. The push-pull converter has the terminal side of its transformer T1 divided into two parts with two pairs of terminals 1′, to provide a balanced connection in series between the two ends L1 and L2 of the line. Each wire of the line has a winding of transformer T1 in series with it. These two windings are center tapped to provide a shunt connection across the line to the terminals 4′ of the parallel converter.

Direct current bias for the transistors is obtained by connecting resistors R3 and R4 between the negative terminal of the exchange battery and ground. The negative terminal is connected through the winding of transformer T4 to the center tap 19 of transformer T2 and thence to the collector electrodes of the transistors. The junction point of resistors R3 and R4 is connected through a winding of transformer T4 to the center tap 18 on transformer T2 and thence to the base electrodes. Resistor R4 is by-passed by condenser C3 for alternating current. The emitter electrodes are connected respectively through resistors R1 and R2 and the two halves of a winding on transformer T2 to center tap 17 and thence through an inductor L to ground. Resistors R1 and R2 are by-passed respectively by condensers C1 and C2.

The terminals 2′ of the push-pull converter are connected directly to the collector electrodes, and to a terminating network Z2. In the parallel converter the transformer T3 is reduced to a single choke winding L, and the terminals 3′ are connected across this inductor and to a terminating network Z3.

One form of network suitable for use as Z2 is shown. It comprises series resistors R5, R6 and R7, shunt condensers C4, C5 and C6 and a resistor R8 across the end.

A network suitable for use as Z3 comprises series resistors R9 and R10 and shunt capacitors C7 and C8.

In this combination repeater there may be some cross modulation between the signals of the two converters produced principally by the transistors TR1 and TR2 but the effect will be unimportant since the two converters handle the same signals.

While I have described above the principles of my invention in connection with specific apparatus, it is to be clearly understood that this description is made only by way of example and not as a limitation to the scope of my invention.

What is claimed is:

1. A negative impedance repeater for use with a transmission line, comprising in combination, a first negative-impedance converter comprising a pair of amplifying devices and circuit connections for push-pull coupling them between a first set of terminals for connection to a first terminating network and a second set of terminals for connection to a second terminating network, a second negative-impedance converter comprising said pair of amplifying devices and circuit connections for parallel coupling them between a third set of terminals for connection to a third terminating network and a fourth set of terminals for connection to a fourth terminating network, whereby said pair of amplifying devices is common to both said converters, and wherein one set of terminals of each converter is open circuit stable and the other set is short circuit stable, one converter having its open circuit stable terminals connected in series with the line and its short circuit stable terminals connected to a local network, and the other converter having its short circuit stable terminals connected in shunt of the line and its open circuit stable terminals connected to another local network.

2. A combination according to claim 1, wherein said amplifying devices comprise transistors.

3. A negative impedance repeater according to claim 1, wherein the said converter which has its open circuit terminals in series with said line is the one having said amplifying devices coupled in push-pull.

4. In combination, a first negative-impedance converter comprising a pair of amplifying devices and circuit connections for push-pull coupling said devices between a first set of terminals for connection to a first terminating network and a second set of terminals for connection to a second terminating network, a second negative-impedance converter comprising said pair of amplifying devices and circuit connections for parallel coupling said devices between a third set of terminals for connection to a third terminating network and a fourth set of terminals for connection to a fourth terminating network, each amplifying device having an input, an output and a common electrode, said connections comprising a first winding coupled between said input electrodes, a second winding coupled between said output electrodes, a third winding coupled between said common electrodes, the second and third windings being inductively coupled and so connected that a signal potential between said common electrodes will be of opposite polarity with respect to a signal potential between said output electrodes, each said winding having a center tap, means for connecting said center taps respectively to direct-current bias means, said first set of terminals being coupled across said first winding, and said second set of terminals being coupled across said second winding, a fourth winding connected between the center tap of said first winding and an A.C. reference potential, a fifth winding connected between the center tap of said second winding and the reference potential, a sixth winding connected between the center tap of said third winding and the reference potential, said fifth and sixth windings being inductively coupled and so connected that signal potentials at the respective center taps of said second and third windings are of opposite polarity with respect to the reference potential, said third set of terminals being coupled across said fourth winding and said fourth set of terminals being coupled across said fifth winding, whereby the converters are respectively and independently open circuit stable across the first and third sets of terminals and short circuit stable across the second and fourth sets of terminals.

5. A negative impedance repeater for use with a transmission line, comprising a combination according to claim 4, with the open circuit stable terminals of one of said converters coupled in series with the line, and the short circuit stable terminals of the other of said converters coupled in shunt of the line, said line connections supplying the corresponding ones of said terminating networks, and each converter having a local terminating network connected to its other set of terminals.

6. A negative impedance repeater according to claim 5, wherein said amplifying devices comprise transistors, said input, output and common electrodes being respectively the emitter, collector and base electrodes.

7. A negative impedance repeater according to claim 6, wherein said first set of terminals is connected in series with said line, and said fourth set of terminals is connected in shunt of said line.

References Cited in the file of this patent

UNITED STATES PATENTS

| | | |
|---|---|---|
| 2,662,123 | Koenig | Dec. 8, 1953 |
| 2,844,669 | Arndt | July 22, 1958 |